(12) United States Patent
Huo et al.

(10) Patent No.: US 11,321,929 B2
(45) Date of Patent: May 3, 2022

(54) SYSTEM AND METHOD FOR SPATIALLY REGISTERING MULTIPLE AUGMENTED REALITY DEVICES

(71) Applicant: Purdue Research Foundation, West Lafayette, IN (US)

(72) Inventors: Ke Huo, West Lafayette, IN (US); Karthik Ramani, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 17/056,563

(22) PCT Filed: Feb. 27, 2019

(86) PCT No.: PCT/US2019/019709
§ 371 (c)(1),
(2) Date: Nov. 18, 2020

(87) PCT Pub. No.: WO2019/221800
PCT Pub. Date: Nov. 21, 2019

(65) Prior Publication Data
US 2021/0256765 A1 Aug. 19, 2021

Related U.S. Application Data

(60) Provisional application No. 62/673,338, filed on May 18, 2018.

(51) Int. Cl.
*G06T 15/00* (2011.01)
*G06T 19/00* (2011.01)
(Continued)

(52) U.S. Cl.
CPC ............ *G06T 19/006* (2013.01); *G06T 15/20* (2013.01); *H04L 67/12* (2013.01); *H04L 67/18* (2013.01);
(Continued)

(58) Field of Classification Search
CPC ... G06T 19/006; G06T 15/20; G06T 2200/08; G06T 2200/24; H04L 67/12; H04L 67/18; H04W 4/023
(Continued)

(56) References Cited

U.S. PATENT DOCUMENTS

2007/0259690 A1 11/2007 Julian
2012/0306850 A1* 12/2012 Balan .................... G06F 3/0304
345/419

(Continued)

FOREIGN PATENT DOCUMENTS

WO 2015/090420 A1 6/2015

OTHER PUBLICATIONS

International Search Report and Written Opinion of related PCT/US19/019709, dated May 17, 2019.
(Continued)

*Primary Examiner* — Jin Ge
(74) *Attorney, Agent, or Firm* — Maginot, Moore & Beck LLP

(57) ABSTRACT

A method and system for enabling a self-localizing mobile device to localize other self-localizing mobile devices having different reference frames is disclosed. Multiple self-localizing mobile devices are configured to survey an environment to generate a three-dimensional map of the environment using simultaneous localization and mapping (SLAM) techniques. The mobile devices are equipped with wireless transceivers, such as Ultra-wideband radios, for measuring distances between the mobile devices using wire-
(Continued)

less ranging techniques. Based on the measured distances and self-localized positions in the environment corresponding to each measured distance, at least one of the mobile devices is configured to determine relative rotational and translational transformations between the different reference frames of the mobile devices. Based on the determined transformations, the mobile devices are able to localize the other mobile devices in their own reference frames, which can enable a variety of spatially aware augmented reality features and interactions.

20 Claims, 7 Drawing Sheets

(51) Int. Cl.
 G06T 15/20 (2011.01)
 H04L 67/12 (2022.01)
 H04L 67/52 (2022.01)
 H04W 4/02 (2018.01)
(52) U.S. Cl.
 CPC ......... *H04W 4/023* (2013.01); *G06T 2200/08* (2013.01); *G06T 2200/24* (2013.01)
(58) Field of Classification Search
 USPC ....................................................... 345/419
 See application file for complete search history.

(56) References Cited

U.S. PATENT DOCUMENTS

| | | | |
|---|---|---|---|
| 2013/0042296 A1* | 2/2013 | Hastings | G06F 21/10 726/1 |
| 2013/0053053 A1 | 2/2013 | Agarwal | |
| 2013/0201210 A1 | 8/2013 | Vaddadi | |
| 2013/0332452 A1 | 12/2013 | Jarvis | |
| 2014/0066124 A1 | 3/2014 | Novet | |
| 2014/0267234 A1* | 9/2014 | Hook | G06T 19/006 345/419 |
| 2014/0323148 A1* | 10/2014 | Schmalstieg | G01C 21/20 455/456.1 |
| 2014/0354685 A1* | 12/2014 | Lazarow | G02B 27/0172 345/633 |
| 2016/0100290 A1 | 4/2016 | Smith | |
| 2016/0179830 A1* | 6/2016 | Schmalstieg | G06F 16/9537 707/722 |
| 2018/0285052 A1* | 10/2018 | Eade | G03H 1/0005 |
| 2019/0114802 A1* | 4/2019 | Lazarow | G06F 1/163 |
| 2019/0287311 A1* | 9/2019 | Bhatnagar | G06T 15/08 |

OTHER PUBLICATIONS

Clemens Arth, Christian Pirchheim, Jonathan Ventura, Dieter Schmalstieg, and Vincent Lepetit. 2015. Instant outdoor localization and slam initialization from 2.5 d maps. IEEE transactions on visualization and computer graphics 21, 11 (2015), 1309-1318.
ARToolKit. 2017. ARToolKit. (2017). Retrieved Dec. 1, 2017 from = https://www.hitl.washington.edu/artoolkit/.
Shuanghua Bai and Houduo Qi. 2016. Tackling the flip ambiguity in wireless sensor network localization and beyond. Digital Signal Processing 55 (2016), 85-97.
Yohan Baillot, L Davis, and J Rolland. 2001. A survey of tracking technology for virtual environments. Fundamentals of wearable computers and auguemented reality (2001), 67.
Steve Benford, Chris Greenhalgh, Gail Reynard, Chris Brown, and Boriana Koleva. 1998. Understanding and constructing shared spaces with mixed-reality boundaries. ACM Transactions on computer-human interaction (TOCHI) 5, 3 (1998), 185-223.
Hrvoje Benko, Edward W Ishak, and Steven Feiner. 2004. Collaborative mixed reality visualization of an archaeological excavation.
In Proceedings of the 3rd IEEE/ACM international Symposium on Mixed and Augmented Reality. IEEE Computer Society, 132-140.
Mark Billinghurst, Ivan Poupyrev, Hirokazu Kato, and Richard May 2000. Mixing realities in shared space: An augmented reality interface for collaborative computing. In Multimedia and Expo, 2000. ICME 2000. 2000 IEEE International Conference on, vol. 3. IEEE, 1641-1644.
Eric Brachmann, Alexander Krull, Frank Michel, Stefan Gumhold, Jamie Shotton, and Carsten Rother. 2014. Learning 6d object pose estimation using 3d object coordinates. In European conference on computer vision. Springer, 536-551.
Robert Castle, Georg Klein, and David W Murray. 2008. Video-rate localization in multiple maps for wearable augmented reality. In Wearable Computers, 2008. ISWC 2008. 12th IEEE International Symposium on. IEEE, 15-22.
Hung-Lin Chi, Shih-Chung Kang, and Xiangyu Wang. 2013. Research trends and opportunities of augmented reality applications in architecture, engineering, and construction. Automation in construction 33 (2013), 116-122.
Codelabs. 2017. WebRTC. (2017). Retrieved Dec. 1, 2017 from = https://webrtc.org/.
DecaWave. 2017. Production Documentation. (2017). Retrieved Dec. 1, 2017 from = https://www.decawave.com/product-documentation.
M-P Dubuisson and Anil K Jain. 1994. A modified Hausdorff distance for object matching. In Pattern Recognition, 1994. vol. 1-Conference A: Computer Vision & Image Processing., Proceedings of the 12th IAPR International Conference on, vol. 1. IEEE, 566-568.
Esspressif. 2017. ESP32. (2017). Retrieved Dec. 1, 2017 from = https://www.espressif.com/en/products/hardware/esp32/overview.
Philipp Fleck, Clemens Arth, Christian Pirchheim, and Dieter Schmalstieg. 2015. [Poster] Tracking and Mapping with a Swarm of Heterogeneous Clients. In Mixed and Augmented Reality (ISMAR), 2015 IEEE International Symposium on. IEEE, 136-139.
Susan R Fussell, Robert E Kraut, and Jane Siegel. 2000. Coordination of communication: Effects of shared visual context on collaborative work. In Proceedings of the 2000 ACM conference on Computer supported cooperative work. ACM, 21-30.
Steffen Gauglitz, Benjamin Nuernberger, Matthew Turk, and Tobias Höllerer. 2014. World-stabilized annotations and virtual scene navigation for remote collaboration. In Proceedings of the 27th annual ACM symposium on User interface software and technology. ACM, 449-459.
Hans Gellersen, Carl Fischer, Dominique Guinard, Roswitha Gostner, Gerd Kortuem, Christian Kray, Enrico Rukzio, and Sara Streng. 2009. Supporting device discovery and spontaneous interaction with spatial references. Personal and Ubiquitous Computing 13, 4 (2009), 255-264.
Google. 2017. ARCore. (2017). Retrieved Sep. 1, 2017 from = https://developers.google.com/ar/.
Jan Gugenheimer, Evgeny Stemasov, Julian Frommel, and Enrico Rukzio. 2017. Sharevr: Enabling co-located experiences for virtual reality between hmd and non-hmd users. In Proceedings of the 2017 CHI Conference on Human Factors in Computing Systems. ACM, 4021-4033.
Mike Hazas, Christian Kray, Hans Gellersen, Henoc Agbota, Gerd Kortuem, and Albert Krohn. 2005. A relative positioning system for co-located mobile devices. In Proceedings of the 3rd international conference on Mobile systems, applications, and services. ACM, 177-190.
Tobias Höllerer, Steven Feiner, Tachio Terauchi, Gus Rashid, and Drexel Hallaway. 1999. Exploring MARS: developing indoor and outdoor user interfaces to a mobile augmented reality system. Computers & Graphics 23, 6 (1999), 779-785.
Jiawei Huang, Tsuyoshi Mori, Kazuki Takashima, Shuichiro Hashi, and Yoshifumi Kitamura. 2015. IM6D: magnetic tracking system with 6-DOF passive markers for dexterous 3D interaction and motion. ACM Transactions on Graphics (TOG) 34, 6 (2015), 217.
Ke Huo, Yuanzhi Cao, Sangho Yoon, Zhuangying Xu,, Guiming Chen, and Karthik Ramani. 2018. Scenariot: Spatially Mapping

(56) References Cited

OTHER PUBLICATIONS

Smart Things Within Augmented Reality Scenes. In Proceedings of the 2018 CHI Conference on Human Factors in Computing Systems. ACM.

Yi Jiang and Victor CM Leung. 2007. An asymmetric double sided two-way ranging for crystal offset. In Signals, Systems and Electronics, 2007. ISSSE'07. International Symposium on. IEEE, 525-528.

Shunichi Kasahara, Valentin Heun, Austin S Lee, and Hiroshi Ishii. 2012. Second surface: multi-user spatial collaboration system based on augmented reality. In SIGGRAPH Asia 2012 Emerging Technologies ACM, 20.

Nikolaos Kyriazis and Antonis Argyros. 2014. Scalable 3d tracking of multiple interacting objects. In Computer Vision and Pattern Recognition (CVPR), 2014 IEEE Conference on. IEEE, 3430-3437.

David Lakatos, Matthew Blackshaw, Alex Olwal, Zachary Barryte, Ken Perlin, and Hiroshi Ishii. 2014. T (ether): spatially-aware handhelds, gestures and proprioception for multi-user 3D modeling and animation. In Proceedings of the 2nd ACM symposium on Spatial user interaction. ACM, 90-93.

David Ledo, Saul Greenberg, Nicolai Marquardt, and Sebastian Boring. 2015. Proxemic-aware controls: Designing remote controls for ubiquitous computing ecologies. In Proceedings of the 17th International Conference on Human-Computer Interaction with Mobile Devices and Services. ACM, 187-198.

Guoqiang Mao, Barias Fidan, and Brian DO Anderson. 2007. Wireless sensor network localization techniques. Computer networks 51, 10 (2007), 2529-2553.

MathWorks. 2017. MATLAB Optimization Toolbox. (2017). Retrieved Dec. 1, 2017 from = https://www.mathworks.com/products/optimization. html.

Microsoft. 2017. Hololens. (2017). Retrieved Sep. 1, 2017 from = https://www.microsoft.com/en-us/hololens.

Gajamohan Mohanarajah, Vladyslav Usenko, Mayank Singh, Raffaello D'Andrea, and Markus Waibel. 2015. Cloud-based collaborative 3D mapping in real-time with low-cost robots. IEEE Transactions on Automation Science and Engineering 12, 2 (2015), 423-431.

Jens Müller, Roman Rädle, and Harald Reiterer. 2016. Virtual Objects as Spatial Cues in Collaborative Mixed Reality Environments: How They Shape Communication Behavior and User Task Load. In Proceedings of the 2016 CHI Conference on Human Factors in Computing Systems. ACM, 1245-1249.

Ohan Oda, Carmine Elvezio, Mengu Sukan, Steven Feiner, and Barbara Tversky. 2015. Virtual replicas for remote assistance in virtual and augmented reality. In Proceedings of the 28th Annual ACM Symposium on User Interface Software & Technology. ACM, 405-415.

Sergio Orts-Escolano, Christoph Rhemann, Sean Fanello, Wayne Chang, Adarsh Kowdle, Yury Degtyarev, David Kim, Philip L Davidson, Sameh Khamis, Mingsong Dou, and others. 2016. Holoportation: Virtual 3d teleportation in real-time. In Proceedings of the 29th Annual Symposium on User Interface Software and Technology. ACM, 741-754.

Tomislav Pejsa, Julian Kantor, Hrvoje Benko, Eyal Ofek, and Andrew Wilson. 2016. Room2room: Enabling life-size telepresence in a projected augmented reality environment. In Proceedings of the 19th ACM conference on computer-supported cooperative work & social computing. ACM, 1716-1725.

Sudeep Pillai and John Leonard. 2015. Monocular slam supported object recognition. arXiv preprint arXiv:1506.01732 (2015).

Polhemus. 2017. Polhemus. (2017). Retrieved Dec. 1, 2017 from = https://polhemus.com/applications/electromagnetics/.

Quuppa. 2017. Quuppa technology. (2017). Retrieved Dec. 1, 2017 from = http://quuppa.com/.

Gerhard Reitmayr and Dieter Schmalstieg. 2004. Collaborative augmented reality for outdoor navigation and information browsing, na.

Luis Riazuelo, Javier Civera, and JMM Montiel. 2014. C2tam: A cloud framework for cooperative tracking and mapping. Robotics and Autonomous Systems 62, 4 (2014), 401-413.

Dieter Schmalstieg, Anton Fuhrmann, Gerd Hesina, Zsolt Szalavari, L Miguel Encarnçao, Michael Gervautz, and Nerner Purgathofer. 2002. The studierstube augmented reality project. Presence: Teleoperators & Virtual Environments 11, 1 (2002), 33-54.

Kjeld Schmidt and Carla Simonee. 1996. Coordination mechanisms: Towards a conceptual foundation of CSCW systems design. Computer Supported Cooperative Work (CSCW) 5, 2-3 (1996), 155-200.

Stela H Seo, James E Young, and Pourang Irani. 2017. Where are the robots? In-feed embedded techniques for visualizing robot team member locations. In Robot and Human Interactive Communication (RO-MAN), 2017 26th IEEE International Symposium on. IEEE, 522-527.

Sixense. 2017. Sixense. (2017). Retrieved Dec. 1, 2017 from = https://www.sixense.com/platform/hardware/.

Srinath Sridhar, Franziska Mueller, Michael Zollhöfer, Dan Casas, Antti Oulasvirta, and Christian Theobalt. 2016. Real-time joint tracking of a hand manipulating an object from rgb-d input. In European Conference on Computer Vision. Springer, 294-310.

Alexander Toshev and Christian Szegedy. 2014. Deeppose: Human pose estimation via deep neural networks. In Proceedings of the IEEE conference on computer vision and pattern recognition 1653-1660.

Unity3D. 2017. Unity3D. (2017). Retrieved Sep. 1, 2017 from = https://unity3d.com/.

Wikitude. 2017. wikitude. (2017). Retrieved Sep. 1, 2017 from = https://www.wikitude.com/.

Chi-Jui Wu, Steven Houben, and Nicolai Marquardt. 2017. Eaglesense: Tracking people and devices in interactive spaces using real-time top-view depth-sensing. In Proceedings of the 2017 CHI Conference on Human Factors in Computing Systems. ACM, 3929-3942.

Ozgur Yeniay. 2005. A comparative study on optimization methods for the constrained nonlinear programming problems. Mathematical Problems in Engineering 2005, 2 (2005), 165-173.

Ferran Argelaguet and Carlos Andujar. 2009. Visual feedback techniques for virtual pointing on stereoscopic displays. In Proceedings of the 16th ACM Symposium on Virtual Reality Software and Technology. ACM, 163-170.

* cited by examiner

SYSTEM AND METHOD FOR SPATIALLY REGISTERING MULTIPLE AUGMENTED REALITY DEVICES

This application claims the benefit of priority of U.S. provisional application Ser. No. 62/673,338, filed on May 18, 2018 the disclosure of which is herein incorporated by reference in its entirety.

GOVERNMENT LICENSE RIGHTS

This invention was made with government support under funding number IIP1632154 awarded by the National Science Foundation. The government has certain rights in the invention.

FIELD

The device and method disclosed in this document relates to augmented reality and, more particularly, to synchronizing and locating objects within augmented reality scenes.

BACKGROUND

Unless otherwise indicated herein, the materials described in this section are not prior art to the claims in this application and are not admitted to the prior art by inclusion in this section.

Augmented reality (AR) applications and devices allow for new and intuitive interactions with the environment and with others. Mobile AR devices using state-of-the-art simultaneous localization and mapping (SLAM) techniques can provide highly accurate self-localization with respect to a surrounding environment without external tracking setups and prior maps. The self-localization of the mobile AR device can enable spatially aware interactions interaction with the environment and with others.

However, AR applications involving multiple users in a collaborative co-located environment require synchronizing spatial frames across the different users, which introduces additional challenges compared to a single-user AR application. To overcome this challenge, conventional solutions introduce an external tracking system to establish a global shared frame. However, the cumbersome infrastructure counteracts the imperative mobility and immediacy of AR collaboration activities. Other solutions involving sharing and integrating maps from individual AR devices to establish a global shared frame. However, such approaches demand very high bandwidth between the devices and suffer from map compatibility issues.

Accordingly, it would be advantageous to provide a mobile AR device with an lightweight solution for synchronizing spatial frames with other mobile AR devices which does not require external tracking systems or extensive compatibility requirements between several mobile AR devices.

SUMMARY

A method for spatially registering mobile devices in an environment is disclosed. The method comprises: measuring a first plurality of distance measurements between a first mobile device and a second mobile device, each distance measurement in the first plurality of distance measurements being measured from a corresponding location of the first mobile device in a first plurality of measurement locations of the first mobile device that are in a first reference frame, the first plurality of distance measurements being measured by operating a first wireless transceiver of the first mobile device to exchange messages with a second wireless transceiver of the second mobile device; receiving, from the second mobile device, a second plurality of measurement locations of the second mobile device, each measurement location in the second plurality of measurement locations being a location of the second mobile device from which a corresponding distance measurement in the first plurality of distance measurements was measured and being in a second reference frame that is different than the first reference frame; and determining a first relative rotational transformation and a first relative translational transformation between the second reference frame and the first reference frame, based on the first plurality of distance measurements, the first plurality of measurement locations of the first mobile device, and the second plurality of measurement locations of the second mobile device.

A first mobile device for spatially registering a second mobile device in an environment is disclosed. The first mobile device comprises: a first wireless transceiver configured to measure distances between the first mobile device and the second mobile device by exchanging messages with a second wireless transceiver of the second mobile device; and a processor operably connected to the first wireless transceiver. The processor being configured to: measure, with the first wireless transceiver, a first plurality of distance measurements between a first mobile device and a second mobile device, each distance measurement in the first plurality of distance measurements being measured from a corresponding location of the first mobile device in a first plurality of measurement locations of the first mobile device that are in a first reference frame; receive, from the second mobile device, a second plurality of measurement locations of the second mobile device, each measurement location in the second plurality of measurement locations being a location of the second mobile device from which a corresponding distance measurement in the first plurality of distance measurements was measured and being in a second reference frame that is different than the first reference frame; and determine a first relative rotational transformation and a first relative translational transformation between the second reference frame and the first reference frame, based on the first plurality of distance measurements, the first plurality of measurement locations of the first mobile device, and the second plurality of measurement locations of the second mobile device

BRIEF DESCRIPTION OF THE DRAWINGS

The foregoing aspects and other features of the method, device, and system are explained in the following description, taken in connection with the accompanying drawings.

DETAILED DESCRIPTION

Figure 1:
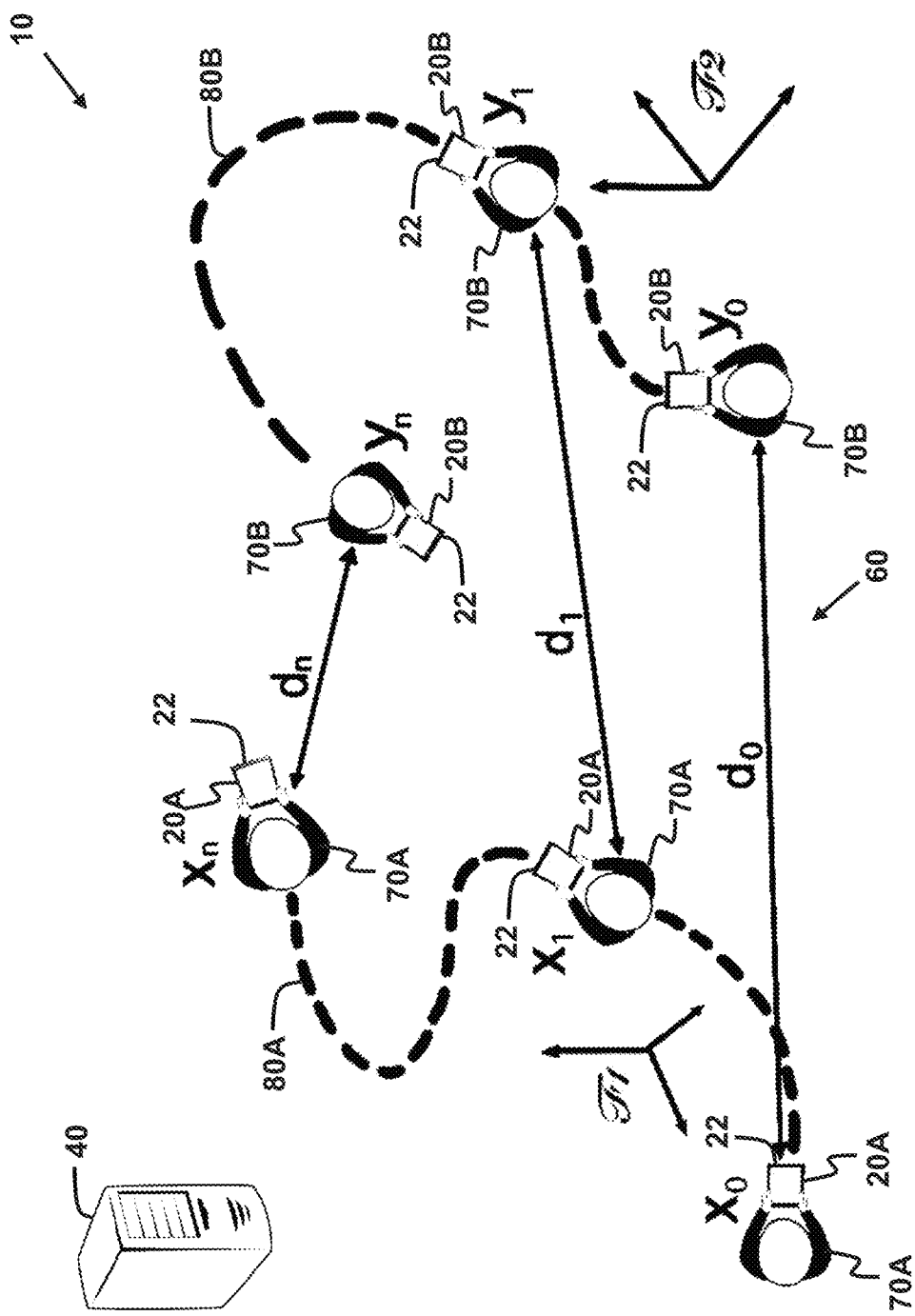
FIG. 1 shows an exemplary embodiment of a collaborative augmented reality system.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art which this disclosure pertains.

System Overview

Figure 2:
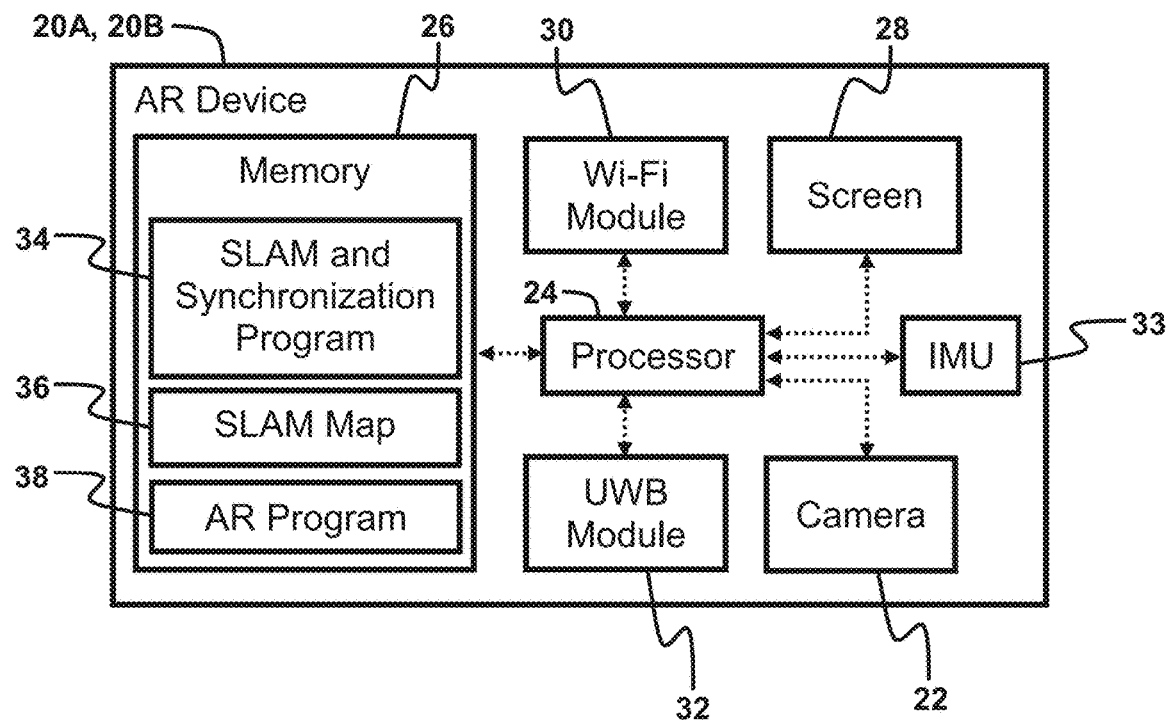
FIG. 2 shows exemplary components of the devices of the collaborative augmented reality system.
Figure 2:
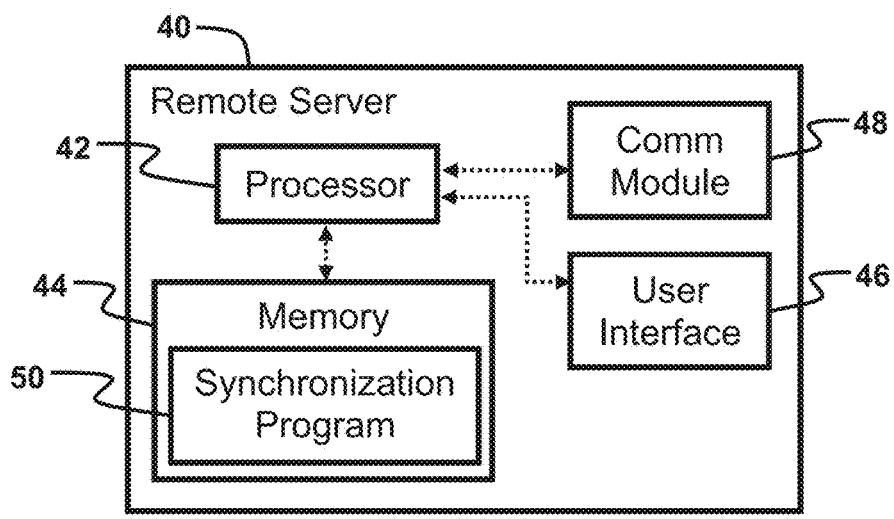

With reference to FIGS. 1-2, exemplary embodiments of a collaborative augmented reality system 10 are shown. To alleviate the cumbersome conventional methods for synchronizing the spatial frames of multiple augmented reality devices, the collaborative augmented reality system 10 enables spatial registration of multiple augmented reality devices without sharing maps or involving external tracking infrastructures. The collaborative augmented reality system 10 employs radio frequency-based distance measurements to determine the relative translational and rotational transformations between the separate coordinate systems of SLAM maps generated by each augmented reality device. The collaborative augmented reality system 10 advantageously does not require map sharing between augmented reality devices and, thus, supports augmented reality devices employing different SLAM techniques having otherwise incompatible SLAM maps. Each of the augmented reality devices 20A, 20B may use any localization technique, including localization techniques that do not involve SLAM maps. The collaborative augmented reality system 10 enables a variety of novel collaborative features and interactions by superimposing graphical digital interfaces onto the physical world which allow a user to collaborate and interact with other users.

As shown in FIG. 1, the collaborative augmented reality system 10 at least includes at least two augmented reality devices 20A, 20B. The augmented reality devices 20A, 20B may comprise any mobile computing device, such as, but not limited to, a smartphone, a tablet computer, a handheld camera, a head mounted display, or the like. In some embodiments, the collaborative augmented reality system 10 includes a remote server 40 (which may also be referred to herein as a remote solver). The augmented reality devices 20A, 20B each comprise a camera 22. The cameras 22 are configured to capture a plurality of images of a scene 60 as the augmented reality devices 20A, 20B are moved around a scene 60, by users 70A, 70B or by some other means. The scene 60 comprises a real-world environment, such as a room, and may contain a variety of objects or structures therein.

The cameras 22 are configured to generate image frames of the scene 60, each of which comprises a two-dimensional array of pixels. Each pixel has corresponding photometric information (intensity, color, and/or brightness). In some embodiments, the cameras 22 are configured to generate RGB-D images in which each pixel has corresponding photometric information and geometric information (depth and/or distance). In such embodiments, the cameras 22 may, for example, take the form of two RGB cameras configured to capture stereoscopic images from which depth and/or distance information can be derived, and/or an RGB camera with an associated IR camera configured to provide depth and/or distance information.

As the augmented reality devices 20A, 20B are moved along respective surveying paths 80A, 80B, the cameras 22 each a capture a plurality of images of a scene 60, which are used to by a simultaneous localization and mapping (SLAM) procedure to generate respective three-dimensional maps of the scene 60. It will be appreciated that, at a given camera position and orientation (camera pose), each respective camera 22 has a restricted field of view such that an image captured by a respective camera 22 at the given camera pose only includes a small portion of the scene 60. However, by moving the augmented reality devices 20A, 20B along the surveying paths 80A, 80B with sufficiently diverse camera poses, information regarding a larger portion of the scene 60 can be captured for the purpose of generating the respective three-dimensional maps of the scene 60 and enabling various augmented reality features. The three-dimensional map of the scene 60 generated by the first augmented reality device 20A has a first reference frame $\mathcal{F}_1$ and three-dimensional map of the scene 60 generated by the second augmented reality device 20B has a second reference frame $\mathcal{F}_2$, which is different from the first reference frame $\mathcal{F}_1$. It will be appreciated however, that the entirety of the scene 60 needn't be surveyed and mapped by the augmented reality devices 20A, 20B. The other augmented reality device(s) 20A, 20B can be spatially registered even if they reside in a portion of the scene 60 that has not been surveyed or mapped. Additionally, it will be appreciated that the surveying paths used to map the scene 60 are not necessarily the same surveying paths used in the spatial registration method discussed in greater detail below.

As discussed in further detail below, the each augmented reality device 20A, 20B is advantageously configured to measure a plurality of distance measurements $d_1, \ldots, d_n$ with respect to the other augmented reality device(s) 20A, 20B corresponding to a plurality of different measurement instances $1, \ldots, n$. The distance measurements $d_1, \ldots, d_n$ are measured at respective positions $x_1, \ldots, x_n$ and $y_1, \ldots, y_n$ of the augmented reality devices 20A, 20B along the surveying paths 80A, 80B. The positions $x_1, \ldots, x_n$ are positions of the first augmented reality device 20A along the first surveying path 80A and the positions $y_1, \ldots, y_n$ are positions of the second augmented reality device 20B along the second surveying path 80B, where the subscripts $1, \ldots, n$ indicate the respective measurement instance.

Based on the plurality of distance measurements $d_1, \ldots, d_n$ and the respective positions $x_1, \ldots, x_n$ and $y_1, \ldots, y_n$, each augmented reality device 20A, 20B utilizes a distance based localization algorithm to determine a respective location of each of the other augmented reality device(s) 20A, 20B within its own three-dimensional map of the scene 60. More particularly, relative translational and rotational transformations between the reference frames $\mathcal{F}_1$ and $\mathcal{F}_2$ are determined by at least one of augmented reality device 20A, 20B or by the remote server 40. Each augmented reality device 20A, 20B utilizes the relative translational and rotational transformations to determine respective location of each of the other augmented reality device(s) 20A, 20B within its own three-dimensional map of the scene 60. Thus, each augmented reality device 20A, 20B is provided with knowledge of the position of each of the other augmented reality device(s) 20A, 20B within its own reference frame without the need for any global map of the scene 60 or for sharing map information. Instead, only distance and position information are shared between augmented reality devices 20A, 20B. By mapping locations of the augmented reality devices 20A, 20B into the coordinate systems of each locally generated three-dimensional map of the scene 60, the collaborative augmented reality system 10 enables a spontaneous collaborative AR environment to spatially coordinate users' interactions.

FIG. 2 shows exemplary components of the augmented reality devices 20A, 20B and the remote server 40 of the augmented reality system 10. It will be appreciated that the components of the augmented reality devices 20A, 20B and the remote server 40 shown and described herein are merely exemplary and that the augmented reality devices 20A, 20B and the remote server 40 may comprise any alternative configuration. Moreover, in the illustration of FIG. 2, the augmented reality devices 20A, 20B are illustrated and described as having identical components and functions. However, the augmented reality devices 20A, 20B may take different forms and have heterogeneous configurations and components.

In the illustrated exemplary embodiment, in addition to the camera 22 discussed above, each augmented reality device 20A, 20B comprises a respective processor 24 and a respective memory 26. The memories 26 are configured to store data and program instructions that, when executed by the processors 24, enable the augmented reality devices 20A, 20B to perform various operations described herein. The memories 26 may be of any type of device capable of storing information accessible by the processors 24, such as a memory card, ROM, RAM, hard drives, discs, flash memory, or any of various other computer-readable medium serving as data storage devices, as will be recognized by those of ordinary skill in the art. Additionally, it will be recognized by those of ordinary skill in the art that a "processor" includes any hardware system, hardware mechanism or hardware component that processes data, signals or other information. The processors 24 may include a system with a central processing unit, graphics processing units, multiple processing units, dedicated circuitry for achieving functionality, programmable logic, or other processing systems. The processors 24 are configured to communicate with other components of the respective augmented reality device 20A, 20B via one or more connections, data busses, or the like (e.g., using SPI and/or UART).

Each augmented reality device 20A, 20B further comprises a respective display screen 28. The display screens 28 may comprise any of various known types of displays, such as LCD or OLED screens. In some embodiments, the display screens 28 may comprise touch screens configured to receive touch inputs from a user. In the case of a head-mounted display, the augmented reality device 20 may comprise a transparent screen, through which a user can view the outside world, configured to superimpose certain graphical elements onto the user's view of the outside world.

Each augmented reality device 20A, 20B further comprises one or more transceivers, modems, or other communication devices configured to enable communications with various other devices, at least including the other augmented reality device(s) 20A, 20B. Particularly, in the illustrated embodiment, each augmented reality device 20A, 20B comprises a respective Wi-Fi module 30 and a respective ultra-wide band (UWB) module 32. The Wi-Fi modules 30 are configured to enable communication with a Wi-Fi network and/or Wi-Fi router (not shown) and include at least one transceiver with a corresponding antenna, as well as any processors, memories, oscillators, or other hardware conventionally included in a Wi-Fi module. The UWB modules 32 are configured to enable direct communication with the other augmented reality device(s) 20A, 20B and include at least one transceiver with a corresponding antenna, as well as any processors, memories, oscillators, or other hardware conventionally included in a UWB module.

As discussed in further detail below, the processors 24 are configured to operate the respective UWB modules 32 to obtain the distance measurements 90 between the augmented reality devices 20A, 20B. The processors 24 are configured to operate the Wi-Fi modules 30 to send and receive additional communications, such as data messages, to and from the other augmented reality device(s) 20A, 20B via the Wi-Fi network and/or Wi-Fi router (e.g., using UDP and/or TCP, as well as WebRTC or the like). It will be appreciated, however, that other communication technologies, such as Bluetooth, Z-Wave, Zigbee, or any other radio frequency-based communication technology can be used to enable data communications between devices in the system 10, as well as enable distance measurement between devices in the system 10. In some embodiments, data communication and distance measurement can be implemented with a single wireless transceiver and/or communication technology.

In some embodiments, each augmented reality device 20A, 20B may further comprise a respective inertial measurement unit (IMU) 33 configured to measure one or more accelerations and/or rotational rates of the augmented reality device 20. In one embodiment, the inertial measurement units 33 comprises one or more accelerometers configured to measure linear accelerations of the respective augmented reality device 20A, 20B along one or more axes (e.g., roll, pitch, and yaw axes) and/or one or more gyroscopes configured to measure rotational rates of the respective augmented reality device 20A, 20B along one or more axes (e.g., roll, pitch, and yaw axes).

The each augmented reality device 20A, 20B may also include a respective battery or other power source (not shown) configured to power the various components within the respective augmented reality device 20A, 20B. In one embodiment, the batteries of the augmented reality devices 20A, 20B are a rechargeable battery configured to be charged when the respective augmented reality device 20A, 20B is connected to a battery charger configured for use with the respective augmented reality device 20A, 20B.

In at least one embodiment, the program instructions stored on the memories 26 include a SLAM and Synchronization program 34. As discussed in further detail below, the processors 24 are configured to execute the SLAM and Synchronization program 34 to process a plurality of images frames captured of the scene 60 and/or inertial data received from the respective IMU 33 to perform visual and/or visual-inertial odometry to estimate the position, orientation, and trajectory of the respective camera 22 with respect to the scene 60 over the plurality of images frames. Based on the estimated position, orientation, and trajectory of the respective camera 22, the processors 24 are each configured to generate a three-dimensional model or map representation of the scene 60, referred to herein as a SLAM map 36, which is stored in the memories 26. As discussed above, the three-dimensional map generated by the first augmented reality device 20A has a first reference frame $\mathcal{F}_1$ and three-dimensional map of the scene 60 generated by the second augmented reality device 20B has a second reference frame $\mathcal{F}_2$, which is different from the first reference frame $\mathcal{F}_1$.

The processors 24 of the augmented reality devices 20A, 20B are further configured to execute the SLAM and Synchronization program 34 to obtain the plurality of distances measurements $d_1, \ldots, d_n$. In some embodiments, the processor 24 of at least one the augmented reality devices 20A, 20B is configured to determine the relative translational and rotational transformations between the reference frames $\mathcal{F}_1$ and $\mathcal{F}_2$. However, as discussed below, in some embodiments, the determination of the relative translational and rotational transformations between the reference frames $\mathcal{F}_1$ and $\mathcal{F}_2$ is offloaded to the remote server 40. Each of the processors 24 are configured to utilize the relative translational and rotational transformations to determine the respective location(s) of each of the other augmented reality device(s) 20A, 20B within its own three-dimensional map of the scene 60.

In at least one embodiment, the program instructions stored on the memories 26 further include an augmented reality program 38. As discussed in further detail below, the processors 24 are configured to execute the augmented reality program 38 to display on the respective display screen 28 real-time images/video captured by the respective camera 22 with graphical elements superimposed thereon for the purpose of enabling various collaborative features and interactions.

With continued reference to FIG. 2, exemplary components of the remote server 40 are described. As mentioned above, in some embodiments the determination of the relative translational and rotational transformations between the reference frames $\mathcal{F}_1$ and $\mathcal{F}F_2$ is offloaded to the remote server 40. The remote server 40 includes a processor 42, a memory 44, a user interface 46, and a network communications module 48. It will be appreciated that the illustrated embodiment of the remote server 40 is only one exemplary embodiment of a remote server 40 and is merely representative of any of various manners or configurations of a personal computer, server, or any other data processing systems that are operative in the manner set forth herein.

The processor 42 is configured to execute instructions to operate the remote server 40 to enable the features, functionality, characteristics and/or the like as described herein. To this end, the processor 42 is operably connected to the memory 44, the user interface 46, and the network communications module 48. The processor 42 generally comprises one or more processors which may operate in parallel or otherwise in concert with one another. It will be recognized by those of ordinary skill in the art that a "processor" includes any hardware system, hardware mechanism or hardware component that processes data, signals, or other information. Accordingly, the processor 42 may include a system with a central processing unit, multiple processing units, or dedicated circuitry for achieving specific functionality.

The memory 44 may be of any type of device capable of storing information accessible by the processor 42, such as a memory card, ROM, RAM, write-capable memories, read-only memories, hard drives, discs, flash memory, or any of various other computer-readable medium serving as data storage devices as will be recognized by those of ordinary skill in the art. The memory 44 is configured to store instructions including a Synchronization program 50 for execution by the processor 42. The processor 42 is configured to operate the network communications module 48 to receive the plurality of distance measurements $d_1, \ldots, d_n$ and the respective positions $x_1, \ldots, x_n$ and $y_1, \ldots, y_n$ from the augmented reality devices 20A, 20B. Based thereon, the processor 42 is configured to execute the Synchronization program 50 to determine the relative translational and rotational transformations between the reference frames $\mathcal{F}_1$ and $\mathcal{F}_2$. The processor 42 is configured to operate the network communications module 48 to send information regarding the relative translational and rotational transformations between the reference frames $\mathcal{F}_1$ and $\mathcal{F}_2$ back to the augmented reality devices 20A, 20B.

The network communications module 48 of the remote server 40 provides an interface that allows for communication with any of various devices, at least including the augmented reality devices 20A, 20B. In particular, the network communications module 48 may include a local area network port that allows for communication with a local area network, such one associated with the Wi-Fi network and/or Wi-Fi router mentioned above. In one embodiment, the network communications module 48 is equipped with a Wi-Fi transceiver or other wireless communications device. Accordingly, it will be appreciated that communications between the remote server 40 and the augmented reality devices 20A, 20B may occur via wireless communications or a combination of wired and wireless communication. Communications may be accomplished using any of various known communications protocols.

The remote server 40 may be operated locally or remotely by a user. To facilitate local operation, the remote server 40 may include a user interface 46. In at least one embodiment, the user interface 46 may suitably include an LCD display screen or the like, a mouse or other pointing device, a keyboard or other keypad, speakers, and a microphone, as will be recognized by those of ordinary skill in the art. Alternatively, in some embodiments, a user may operate the remote server 40 remotely from another computing device which is in communication therewith via the network communications module 48 and has an analogous user interface.

Method of Synchronizing Reference Frames of Multiple AR Devices

Methods for operating the collaborative augmented reality system 10 are described below. In particular, methods are described for operating the AR devices 20A, 20B to determine the relative translational and rotational transformations between the reference frames $\mathcal{F}_1$ and $\mathcal{F}_2$ for the purpose of localizing the AR devices 20A, 20B in the both reference frames $\mathcal{F}_1$ and $\mathcal{F}_2$. In the description of the methods, statements that a method is performing some task or function refers to a controller or processor executing programmed instructions (e.g., the SLAM and Synchronization program 34 and/or Synchronization program 50) stored in non-transitory computer readable storage media operatively connected to the controller or processor to manipulate data or to operate one or more components in the vehicle access system 10 to perform the task or function. Particularly, the processors 24 of the AR devices 20A, 20B and/or the processor 42 of the remote server 40 may be such a controller or processor. Alternatively, the controller or processor may be implemented with more than one processor and associated circuitry and components, each of which is configured to form one or more tasks or functions described herein. Additionally, the steps of the methods may be performed in any feasible chronological order, regardless of the order shown in the figures or the order in which the steps are described.

Figure 3:
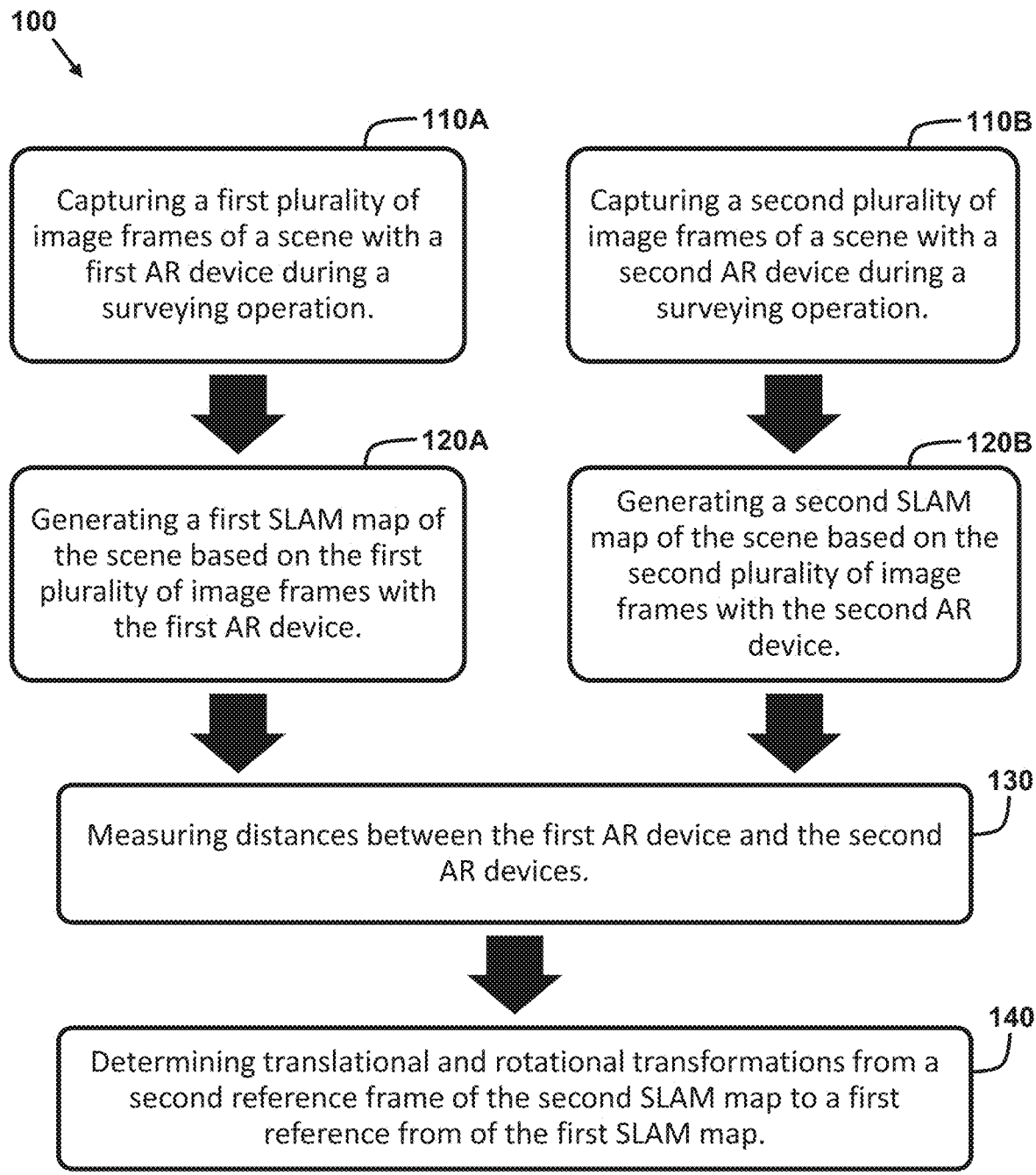
FIG. 3 shows a logical flow diagram for a method of synchronizing reference frames of multiple AR devices.

FIG. 3 shows a method 100 for synchronizing reference frames of multiple AR devices. In summary, as discussed above, when the AR devices 20A, 20B survey the environment, they generate SLAM maps 36 having different reference frames. The method 100 advantageously enables the AR devices 20A, 20B to localized each other AR device 20A, 20B within its own reference frame, without the need for sharing SLAM map information, which is bandwidth intensive and time consuming. Instead, the method 100 leverages the mobility of the AR devices 20A, 20B to collect plurality distance measurements between the AR devices 20A, 20B at different positions along their respective surveying paths. Based on the distance measurements and the self-localized positions of the AR devices 20A, 20B at each measurement instance, relative rotational and translational transformations between the local reference frame of each of the AR devices 20A, 20B can be determined. Based on the determined transformations, each the AR devices 20A, 20B can localize each other AR device 20A, 20B within its own reference frame based on self-localized positions from the other AR device 20A, 20B.

The method 100 begins with steps of capturing a first plurality of image frames of a scene with a first AR device during a surveying operation (block 110A) and capturing a second plurality of image frames of a scene with a second AR device during a surveying operation (block 110B). Particularly, with respect to the embodiments described in detail herein, the processors 24 of the AR devices 20A, 20B are configured to operate the respective camera 22 to capture a plurality of image frames of an environment (e.g., the scene 60) and to receive the plurality of image frames from the camera 22, as the AR devices 20A, 20B are moved along respective surveying paths (e.g., the surveying paths 80A, 80B). As discussed above, each image frame comprises a two-dimensional array of pixels in which pixel has corresponding photometric information (e.g., one or more intensity, color, and/or brightness values). In some embodiments, the image frames are RGB-D image frames in which each pixel has both photometric information (e.g., one or more intensity, color, and/or brightness values) and geometric information (e.g., a depth or distance value). In other embodiments, the processors 24 are configured to extract and/or estimate geometric information based on the photometric information using a key feature detection technique. The pluralities of image frames may be stored temporarily in buffer memories of the memories 26. In some embodiments, certain image frames may be designated as keyframes and stored on a longer term basis in the memories 26.

The method 100 continues with steps of generating a first SLAM map of the scene based on the first plurality of image frames with the first AR device (block 120A) and generating a second SLAM map of the scene based on the second plurality of image frames with the second AR device (block 120B). Particularly, the processors 24 of the AR devices 20A, 20B are configured to execute the SLAM and Synchronization program 34 to process the respective plurality of images frames captured of the scene 60 to perform visual odometry to estimate the position, orientation, and trajectory of the respective camera 22 with respect to the scene 60 over the respective plurality of images frames. In some embodiments, the processors 24 are configured to receive inertial data from the respective IMU 33 (i.e., acceleration data and rotation rate data) or other non-visual odometry information from additional sensors. Utilizing the inertial data or other non-visual odometry information in addition to the image frames themselves, the processors 24 are configured to perform visual-inertial odometry, or some other kind of sensor-supplemented odometry, to estimate the position, orientation, and trajectory of the respective camera 22. Using the estimated position, orientation, and trajectory of the respective camera 22 with respect to the scene 60, each processor 24 is configured to execute the SLAM and Synchronization program 34 to generate a respective three-dimensional model or map representation of the scene 60, referred to herein as the SLAM map 36, based on the photometric information and/or geometric information corresponding to each image frame in the plurality of image frames. As discussed above, the three-dimensional map and/or the SLAM map 36 generated by processor 24 of the first AR device 20A has a first reference frame $\mathcal{F}_1$ and three-dimensional map and/or the SLAM map 36 generated by processor 24 of by the second AR device 20B has a second reference frame $\mathcal{F}_2$, which is different from the first reference frame $\mathcal{F}_1$.

It will be appreciated that problems of estimating the position, orientation, and trajectory of the camera 22 and of generating the three-dimensional model or map representation of the scene 60 are interdependent and, thus, in at least some embodiments, the processors 24 are configured to perform the processes simultaneously and iteratively as new image frames are received from the respective camera 22, using a SLAM algorithm. When each new image frame is received, the processors 24 are configured to associate the photometric information and/or geometric information of the new image frame with pre-existing information in the respective SLAM map 36 and update or refine the information in the respective SLAM map 36 based on the new information.

The SLAM maps 36 generated by the of the AR devices 20A, 20B may take several different forms and, notably, the SLAM map 36 generated by the first AR device 20A needn't take the same form as the SLAM map 36 generated by the second AR device 20B. As used herein a "SLAM map" refers to any data structure defining a three-dimensional model, map, or other representation of a scene that has been captured by a camera. In some embodiments, one of the SLAM maps 36 may comprise sparsely defined key features such as points, lines, or other geometric shapes representing the objects and structures of the scene. In some embodiments, one of the SLAM maps 36 may comprise a dense point cloud representing the objects and structures of the scene. Each of the points, lines, or other geometric shapes of the SLAM maps 36 may be associated with photometric information (e.g., one or more intensity, color, and/or brightness values).

In some embodiments, the SLAM maps 36 have a three-dimensional reference frame (i.e., the reference frames $\mathcal{F}_1$ and $\mathcal{F}_2$) characterized by three orthogonal coordinate axes (e.g., x, y, and z axes). The processors 24 are configured to receive data and/or signals regarding linear accelerations of the respective augmented reality device 20A, 20B along one or more axes and/or data and/or signals regarding rotational rates of the respective augmented reality device 20A, 20B along one or more axes from the IMU 33. In at least one embodiment, the processors 24 are configured to generate the SLAM maps 36 such that a first coordinate axis (e.g., the y-axis) is gravity aligned based on the data and/or signals regarding linear accelerations received from the IMU 33. Consequently, second and third coordinate axes (e.g., the x-axis and z-axis) of each SLAM map 36 form a horizontal plane with respect to the earth. In this way, the first coordinate axes (e.g., the y-axes) of both the reference frames $\mathcal{F}_1$ and $\mathcal{F}_2$ are essentially aligned without synchronization.

The method 100 continues with a step of measuring distances between the first AR device and the second AR device (block 130). Particularly, the first AR device 20A is moved along a first surveying path (e.g., the surveying path 80A) through the environment, which may be during the surveying process of step 110A. Meanwhile, the second AR device 20B is moved along a second surveying path (e.g., the surveying path 80B) through the environment, which may be during the surveying process of step 110B.

The processors 24 of each the AR devices 20A, 20B are configured to execute instructions of the SLAM and Synchronization program 34 to operate the respective UWB modules 32 to exchange messages with the respective UWB modules 32 of each other AR device 20A, 20B in order to measure a set of N distance measurements between each combination of AR devices 20A, 20B (e.g., a set of N distance measurements between the first AR device 20A and the second AR device 20B). In at least one embodiment, the processors 24 of the AR devices 20A, 20B are configured to employ an asymmetrical double-sided two-way ranging scheme for time-of-flight measurements between each other AR device 20A, 20B, from which the distance measurements can be derived. The processor 24 of at least one of the AR device 20A, 20B is configured to store the set of N distance measurements in the respective memory 26.

Each distance measurement in the set of N distance measurements is measured at different measurement time and at different measurement location along the surveying paths 80A, 80B (also referred to herein as different measurement instances). The set of N distance measurements between each pair of AR device 20A, 20B (e.g., between the first AR device 20A and the second AR device 20B) form a distance vector D. The elements of the distance vector D are denoted $\hat{d}_i$, where $i \in \{1, \ldots, N\}$ denotes the respective measurement instance.

The processors 24 of each the AR devices 20A, 20B are configured to execute instructions of the SLAM and Synchronization program 34 to determine their respective measurement location at each measurement instance based on images captured by the respective camera 22 at each measurement location. More particularly, the processor 24 of the first AR device 20A is configured to determine measurement locations ${}^1X = [{}^1x_1, \ldots, {}^1x_N]^T \in \mathbb{R}^{N \times 3}$ which reside along the surveying path of the first AR device 20A and from which the set of N distance measurements were measured, where ${}^1x_i \in \mathbb{R}^3$ denote positions of the first AR device 20A at measurement time t=i. Likewise, the processor 24 of second AR device 20B is configured to determine measurement locations ${}^2Y = [{}^2y_1, \ldots, {}^2y_N]^T \in \mathbb{R}^{N \times 3}$ which reside along the surveying path of the second AR device 20B and from which the set of N distance measurements were measured, where ${}^2y_i \in \mathbb{R}^3$ denote positions of the second AR device 20B at measurement time t=i. The values of measurement locations ${}^1X$ are in the first reference frame $\mathcal{F}_1$ and the values of measurement locations ${}^2Y$ are in the first reference frame $\mathcal{F}_2$. It at least one embodiment, the processors 24 of each the AR devices 20A, 20B are configured to store the values of the respective self-referred local measurement locations ${}^1X$ and ${}^2Y$ in the respective memories 26.

In the detailed embodiments described herein, the UWB modules 32 are utilized for distance measurements between the AR devices 20A, 20B. However, it will be appreciated that any type of wireless transceiver can be used to perform the distance measurements if it enables sufficient accuracy for the intended use.

The method 100 continues with a step of determining translational and rotational transformations from a second reference frame of the second SLAM map to a first reference from of the first SLAM map (block 140). Firstly, it will be appreciated that the determination of the relative transformation between the reference frames $\mathcal{F}_1$ and $\mathcal{F}_2$ can be determined by just one of the AR device devices 20A, 20B, by both of the AR device devices 20A, 20B, or by the remote server 40. In order to minimize repetition, the process for determining the relative transformation between the reference frames $\mathcal{F}_1$ and $\mathcal{F}_2$ is described only with respect to first AR device devices 20A and, in the alternative, with respect to the remote server 40.

In the case that the first AR device 20A is to determine the relative transformations between the reference frames $\mathcal{F}_1$ and $\mathcal{F}_2$, the processor 24 of the second AR device 20B is configured to operate the respective Wi-Fi module 30 to transmit the local measurement locations ${}^2Y$ to the first AR device 20A. The processor 24 of the first AR device 20A is configured to operate the respective Wi-Fi module 30 to receive the measurement locations ${}^2Y$ from the second AR device 20B.

Alternatively, in the case that the server 40 is to determine the relative transformations between the reference frames $\mathcal{F}_1$ and $\mathcal{F}_2$, the processors 24 of each of the AR devices 20A, 20B are configured to operate the respective Wi-Fi modules 30 to transmit the local measurement locations ${}^1X$ and ${}^2Y$ to the first AR device 20A, as well as the distance measurements $\hat{d}_i$. The processor 42 of the server 40 is configured to operate the respective network communications module to receive the measurement locations measurement locations ${}^1X$ and ${}^2Y$ and the distance measurements $\hat{d}_i$ from the AR devices 20A, 20B.

The processor 24 and/or the processor 42 is configured to execute instructions of the SLAM and Synchronization program 34 and/or the Synchronization program 50 to determine a relative rotational transformation $R_2^1$ and a relative translational transformation $T_2^1$ between the second reference frame $\mathcal{F}_2$ and the first reference frame $\mathcal{F}_1$, which can be used to convert positions ${}^2y$ in the second reference frame $\mathcal{F}_2$ into positions ${}^1y$ in the first reference frame $\mathcal{F}_1$, and visa versa, e.g., using the equation ${}^1y = R_2^1 \, {}^2y + T_2^1$. The distance between the first AR device 20A and the second AR device 20B at each measurement instance i while they move along their surveying paths is as follows:

$$d_i = \|{}^1x_i - {}^1y_i\| = \|{}^2x_i - {}^2y_i\|$$

$$d_i = \|{}^1x_i - R_2^1 \, {}^2y_i - T_2^1\|.$$

Because of the distance errors introduced by the measurements, the processor 24 and/or the processor 42 is configured to estimate the relative rotational transformation $R_2^1$ and the relative translational transformation $T_2^1$ by minimizing differences between (i) the measured distances $\hat{d}_i$ and (ii) the distances $d_i$ calculated from the estimated transformations $R_2^1$ and $T_2^1$ and the self-localized measurement locations measurement locations $^1X$ and $^2Y$. Particularly, the transformations $R_2^1$ and $T_2^1$ can be estimated as an optimization problem, as follows:

$$\min_{R_2^1,T_2^1} S(^1X, {}^2Y, R_2^1, T_2^1) = \min_{R_2^1,T_2^1} \sum_{i \leq N} \omega_i(\hat{d}_i - d_i(^1X, {}^2Y, R_2^1, T_2^1)), \quad (1)$$

where the weight $\omega_i$ defines a quality of the respective distance measurement $\hat{d}_i$ at the time t=i. In some embodiments, the weights $\omega_i$ can be all set equal to 1. However, in other embodiments, the quality and/or confidence of each distance measurement $\hat{d}_i$ can be evaluated according to one or more metrics and the weights $\omega_i$ are set according to the evaluated quality. In at least one embodiment, the processor 24 and/or the processor 42 is configured to utilize a sequential quadratic programming (SQP) algorithm to estimate the transformations $R_2^1$ and $T_2^1$.

The general formulation of the optimization problem of equation requires searching for solutions in a six dimensional space because the unknown transformations $R_2^1$ and $T_2^1$ together have six degrees of freedom, i.e., three rotational degrees of freedom and three translational degrees of freedom. Particularly, the relative rotational transformation $R_2^1$ is characterized by three orthogonal rotational components about three orthogonal coordinate axes: a rotation angle $\theta_x$ about the x axis, a rotation angle $\theta_y$ about the y axis, and a rotation angle $\theta_z$ about the z axis, each of which embodies a rotational degree of freedom. Similarly, the relative rotational transformation $R_2^1$ is characterized by three orthogonal translational components along three orthogonal coordinate axes: a translation $t_x$ along the x axis, a translation $t_y$ along the y axis, and a translation $t_z$ along the z axis, each of which embodies a translational degree of freedom. However, in some embodiments, the processor 24 and/or the processor 42 is configured to utilized various techniques to reduce the degrees of freedom and thereby reduce the computational complexity in estimating unknown transformations $R_2^1$ and $T_2^1$.

First, as discussed above, in some embodiments, the processor 24 is configured to generate the SLAM map 36 such that a first coordinate axis (e.g., the y-axis) and the second and third coordinate axes (e.g., the x and z axes) form a horizontal plane (e.g., the x-z plane) with respect to earth. In this way, the y-axes of the reference frames $\mathcal{F}_1$ and $\mathcal{F}_2$ are essentially aligned without synchronization. As a result, the search domain can be reduced from six degrees of freedom to four degrees of freedom. Particularly, the processor 24 and/or the processor 42 is configured to set the rotation angle $\theta_x$ about the x axis and the rotation angle $\theta_z$ about the z axis equal to zero and only determines a value for the rotation angle $\theta_y$ about y axis. To this end, we adjust equation (1) to constrain the optimization problem as follows:

$$\min_{\theta,T_2^1} S(^1X, {}^2Y, \theta_y, T_2^1) = \min_{\theta,T_2^1} \sum_{i \leq N} \omega_i(\hat{d}_i - d_i(^1X, {}^2Y, \theta_y, T_2^1))^2. \quad (2)$$

Second, we note that when a user interacts with the AR device 20A, 20B, the translational movements along gravity aligned vertical y axis are limited (e.g., around one meter) considering ergonomic factors such as arm lengths and fatigues. This is in contrast with the movements along x and z axes, which can easily reach to dozens of meters. Additionally, for distance based optimization problems, a flip ambiguity arises easily when the sample positions roughly appear on a plane which implies an irregular distribution, i.e. not a uniform distribution in 3D space. These concerns can be tackled in several ways.

In one embodiment, the processor 24 and/or the processor 42 is configured to constraining the movements on y axis during the surveying operation. Particularly, the processor 24 and/or the processor 42 may be configured operate the display screen 28 to display a message instructing the user to maintain a height within a predetermined range during the surveying operation. In this way, the range of translational variation along the y axis is further constrained during the surveying operation.

In one embodiment, the processor 24 and/or the processor 42 is configured to initialize the y component of the SLAM map 36 at a predetermined height (e.g., ~1.5 meters above the floor). In other words, when the surveying operation is performed to generate the SLAM map 36, the location of the camera 22 of the AR device 20A, 20B is presumed to be at a predetermined height within the SLAM map 36 (e.g., ~1.5 meters above the floor), rather than the initial height of the camera 22 of the AR device 20A, 20B corresponding to a zero value along the y axis.

In one embodiment, the processor 24 and/or the processor 42 is configured to determine a respective average value of the y coordinates of each set of measurement locations $^1X$ and $^1Y$. The processor 24 and/or the processor 42 is configured to update the y coordinates of each set of measurement locations $^1X$ and $^1Y$ by setting value of the y coordinates of the measurement locations $^1X$ and $^1Y$ to their respective average values before estimating unknown transformations $R_2^1$ and $T_2^1$.

In one embodiment, the processor 24 and/or the processor 42 is configured to determine the translation $t_y$ along the y axis such that it is within a predetermined range of values $t_{y_{min}} \leq t_y \leq t_{y_{max}}$. Particularly, the processor 24 and/or the processor 42 is configured to further constrain the search space by placing heuristic boundaries on translational component $t_y$ along the y axis, as follows:

$$\min_{\theta,T_2^1} S(^1X, {}^2Y, \theta_y, T_2^1) = \min_{\theta,T_2^1} \sum_{i \leq N} \omega_i(\hat{d}_i - d_i(^1X, {}^2Y, \theta_y, T_2^1))^2 \quad (3)$$

s.t. $t_{y_{min}} \leq t_y \leq t_{y_{max}}$, where $t_y$ denotes translational component of $T_2^1$ along the y axis, and $t_{y_{min}}$ and $t_{y_{max}}$ are predetermined minimum and maximum values of $t_y$, respectively. In an exemplary embodiment $t_{y_{min}}$ is set equal to −0.1 meter and $t_{y_{max}}$ is set equal to 0.1 meter and the y component of the SLAM map 36 is initialized at 1.5 meters.

Although the method 100 has been described primarily with respect to just two AR device 20A, 20B, the method 100 can be extended to more than two AR device 20A, 20B. For more than two users, we consider different situations: (i) multiple users form a new collaboration and (ii) one or more users join an existing collaboration. For the first situation, a total number of k users results in k(k−1)/2 different transformations, among which only k−1 transformations are independent. The k−1 independent transformations in a manner of one-to-many. Namely, the distances are measured from a single device to the rest of devices. For example with three users, independent transformations $R_2^1$, $T_2^1$ and $R_3^1$, $T_3^1$ can be determined by performing the steps 130 and 140 of method 100 with respect to the first and second AR devices, then again with respect to the first and third AR devices. Once the independent transformations $R_2^1$, $T_2^1$ and $R_3^1$, $T_3^1$ are determined, the additional homogeneous transformation $R_3^2$, $T_3^2$ can be determined as follows:

$$\begin{bmatrix} R_3^2 & T_3^2 \\ 0 & 1 \end{bmatrix} = \begin{bmatrix} R_2^1 & T_2^1 \\ 0 & 1 \end{bmatrix}^{-1} \begin{bmatrix} R_3^1 & T_3^1 \\ 0 & 1 \end{bmatrix}. \quad (4)$$

For the second situation in which one or more new users join an existing collaboration, one user is selected from the existing collaboration and the localization is performed between the new users and the selected one user.

After the transformations $R_2^1$ and $T_2^1$ are estimated, they can advantageously be used to by the AR devices 20A, 20B to localize one another in their own reference frames without the need for sharing SLAM map information. Particularly, in the case that only the first AR device 20A determined the transformations $R_2^1$ and $T_2^1$, the processor 24 is configured to operate the Wi-Fi module 30 to transmit the transformations $R_2^1$ and $T_2^1$ to the other AR device(s) 20B. The processor 24 of the other AR device(s) 20B is configured to operate the Wi-Fi module 30 to receive the transformations $R_2^1$ and $T_2^1$ from the first AR device 20A. Alternatively, in the case that the server 40 determine the transformations $R_2^1$ and $T_2^1$, the processor 42 is configured to operate the network communications module 48 to transmit the transformations $R_2^1$ and $T_2^1$ to the AR devices 20A, 20B. The processors 24 of the AR devices 20A, 20B are configured to operate the Wi-Fi module 30 to receive the transformations $R_2^1$ and $T_2^1$ from the server 40. Once the AR devices 20A, 20B have the transformations $R_2^1$ and $T_2^1$, the processors 24 are configured to store the transformations $R_2^1$ and $T_2^1$ in the memories 26 for future usage.

Exemplary Use Cases

The method 100 for spatially registering the AR devices advantageously enables every AR device to have knowledge of the locations and orientations of each other AR device in its own reference frame, without the need for sharing SLAM map information. Particularly, during some collaborative uses of the AR devices 20A, 20B, the processors 24 are configured to operate the respective Wi-Fi modules 30 to transmit current locations and orientations of the respective AR device 20A, 20B to the other AR device(s) 20A, 20B. The processor 24 are configured to operate the respective Wi-Fi modules 30 to receive to current locations and orientations of the other AR device(s) 20A, 20B, which are in the respective reference frames of the other AR device(s) 20A, 20B. The processors 24 are configured to determine the current location and current orientation of the other AR device(s) 20A, 20B within their local reference frames by converting the received current location and orientation values using the transformations $R_2^1$ and $T_2^1$. In this way, each AR device 20A, 20B has knowledge of the location and orientation of each other AR device(s) 20A, 20B it its own local reference frame without sharing SLAM map information.

Additionally, the method 100 enables the AR devices 20A, 20B to collaborate by sharing information regarding real and virtual objects in the environment. Particularly, during some collaborative uses of the AR devices 20A, 20B, the processors 24 are configured to operate the respective Wi-Fi modules 30 to transmit object data regarding a real or virtual object and/or structure in the environment. Exemplary object data may relate to virtual objects located in the environment, such the ball and catching baskets illustrated in FIG. 4 or the golden coins illustrated in FIG. 5, discussed below. Similarly, exemplary object data may relate to geometric and/or photometric data corresponding to real objects and structures in the environment that have been surveyed and stored in the SLAM map 36, as illustrated in FIG. 6, discussed below. The object data includes information regarding a position and/or orientation of the real or virtual objects, which is in the reference from of the AR device transmitting the object data. The processors 24 of the AR devices 20A, 20B are configured to operate the respective Wi-Fi modules 30 to receive the object data from the other the other AR device(s) 20A, 20B, which are in the respective reference frames of the other AR device(s) 20A, 20B. The processors 24 are configured to determine the locations and orientations of the real or virtual objects within their local reference frames by converting the received location and orientation values using the transformations $R_2^1$ and $T_2^1$. In this way, each AR device 20A, 20B is able to share information about real and virtual objects in the environment for the purposes of collaboration between the AR devices 20A, 20B.

In at least some embodiments, the processors 24 of the AR devices 20A, 20B are configured to execute instructions of the AR application 38 to render an AR graphical user interface and display it on the display screen 28. The AR graphical user interface can include one or more graphical elements or graphical depictions. In the case of a handheld AR device, the graphical elements or graphical depictions of the AR graphical user interface may be superimposed on real-time video and/or image frames captured by the camera 22. However, in the case of a head mounted display, the graphical elements or graphical depictions of the AR graphical user interface are rendered on the transparent display screen such that they are superimposed on a view of the user's surroundings through the head mounted display. The graphical elements are advantageously rendered depending on the known location and orientation of the other AR device(s) 20A, 20B and/or of the real/virtual objects, in the local reference frame. In this way, by exploiting the spatial relationship between different AR devices 20A, 20B, e.g., distance, orientation, and movement, AR devices 20A, 20B can provide spatially aware collaboration using AR.

Figure 4:
FIG. 4 shows a graphical user interface illustrating a first exemplary use case of the method of FIG. 3.

FIG. 4 shows an AR graphical interface 200 illustrating a first exemplary use case of the method 100. Particularly, each user 202 has an AR device and is presented with a graphical interface on the display thereof, such as the AR graphical interface 200, which enables the users 202 to play a multiplayer ball catching game. The game leverages the spatial relationship between the AR devices and the camera pose of each AR device to enable a collaborative and spatially aware game. The AR graphical interface 200 includes graphical elements 204 (e.g., a ball and catching baskets), which are superimposed upon real-time video and/or image frames and are rendering depending on the known spatial locations of the other users and depending on the camera pose of the other users.

Figure 5:
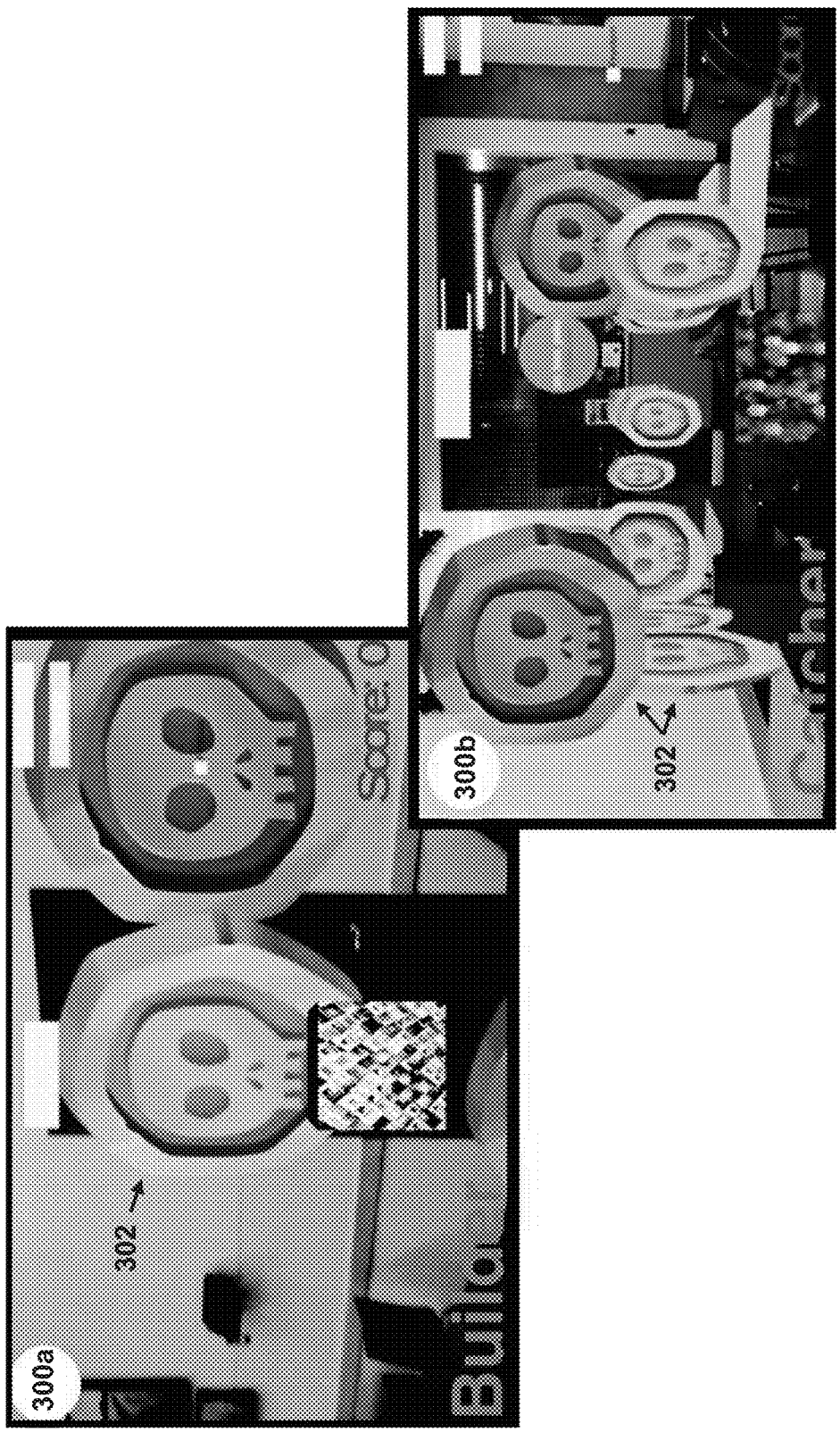
FIG. 5 shows graphical user interfaces illustrating a second exemplary use case of the method of FIG. 3.
Figure 6:
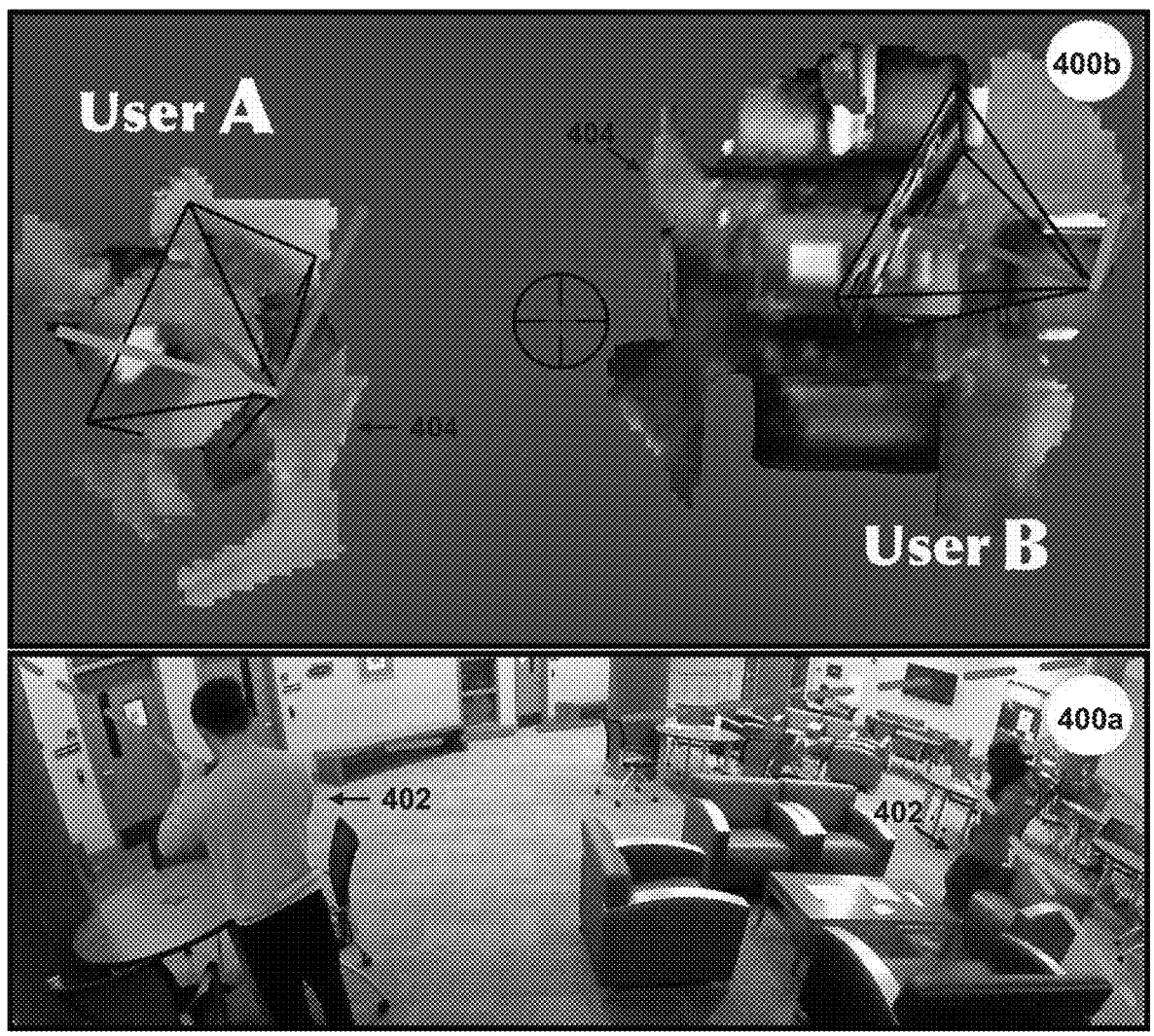
FIG. 6 illustrates a third exemplary use case of the method of FIG. 3.

FIG. 5 shows AR graphical interfaces 300*a-b* illustrating illustrates a second exemplary use case of the method 100. Particularly, each user has an AR device and is presented with a graphical interface on the display thereof, such as the AR graphical interface 300*a* or 300*b*, which enables the users to play a multiplayer coin-collection game. For example, in this coin-collection game, a builder (300*a*) first places virtual objects 302 in the environment (e.g., golden coins). Then a catcher (300*b*) can then see the virtual objects 302 placed in the environment by the other user on his or her own AR device.

FIG. 6 illustrates a third exemplary use case of the method 100. In a co-located collaborative context 400*a*, two users 402 who are distant from each other may also want communicate through view sharing instantly. The users are offered a spatially aware shared view 400*b*, which includes visualizations 404 of the environment surveyed and/or seen by the other users. Also during the collaboration, users are allowed to freely refer to each other's surrounding environment. As shown, the users scanned the environment around each of them separately. Then the scanned geometry models are registered using the spatial transformation method 100. Additionally, as a first user walks around, the other user can access the first-person view through the camera.

Figure 7:
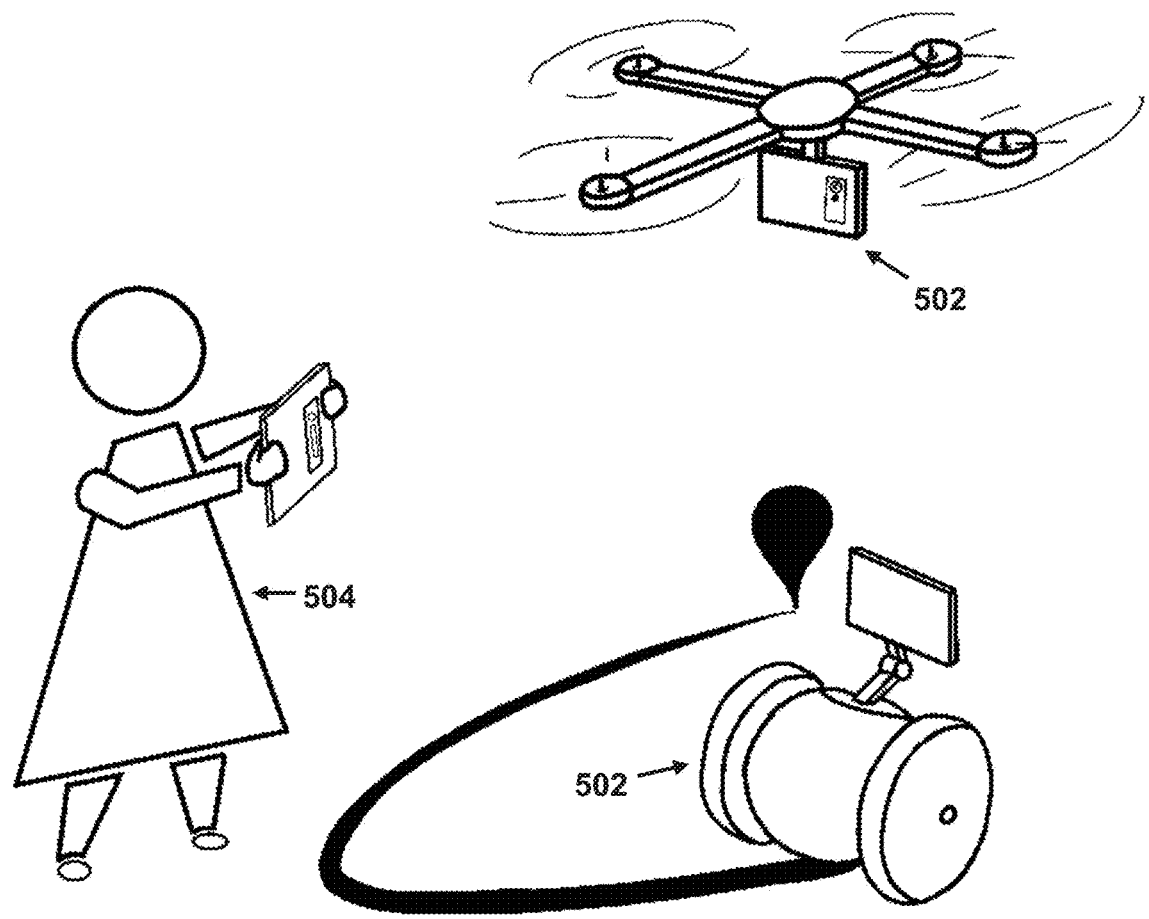
FIG. 7 illustrates a fourth exemplary use case of the method of FIG. 3.

FIG. 7 illustrates a fourth exemplary use case of the method 100. In the future, we envision that human beings and autonomous robots interact with each other naturally. In this context, the spatial awareness will be critical. In the example of FIG. 7, an AR device is attached to one or more an autonomous robots 502 and synchronized with an AR device of a user 504. The method 100 enables coordination of the autonomous robots 502 with respect to the user's position and orientation. Thus, the user 504 can interact with the robot naturally through his/her spatial movement. For example, in this use case, the robot can mimic the user's movement in the same direction and adjust the facing direction accordingly.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A method for spatially registering mobile devices in an environment, the method comprising:
   measuring a first plurality of distance measurements between a first mobile device and a second mobile device, each distance measurement in the first plurality of distance measurements being measured from a corresponding location of the first mobile device in a first plurality of measurement locations of the first mobile device that are in a first reference frame, the first plurality of distance measurements being measured by operating a first wireless transceiver of the first mobile device to exchange messages with a second wireless transceiver of the second mobile device;
   receiving, from the second mobile device, a second plurality of measurement locations of the second mobile device, each measurement location in the second plurality of measurement locations being a location of the second mobile device from which a corresponding distance measurement in the first plurality of distance measurements was measured and being in a second reference frame that is different than the first reference frame; and
   determining a first relative rotational transformation and a first relative translational transformation between the second reference frame and the first reference frame, based on the first plurality of distance measurements, the first plurality of measurement locations of the first mobile device, and the second plurality of measurement locations of the second mobile device.

2. The method according to claim 1, the measuring the first plurality of distance measurements further comprising:
   measuring the first plurality of distance measurements while the first mobile device is moved along a first path in the environment and while the second mobile device is moved along a second path in the environment, the first path comprising the first plurality of measurement locations of the first mobile device, the second path comprising the second plurality of measurement locations of the second mobile device.

3. The method according to claim 1 further comprising:
   capturing a first plurality of images of the environment with a camera of the first mobile device, the first plurality of images being captured as the first mobile device is moved in the environment; and
   generating, with a processor of the first mobile device, a three-dimensional map of the environment based on the first plurality of images of the environment, the three-dimensional map of the environment having the first reference frame.

4. The method according to claim 3 further comprising:
   determining, with the processor, the first plurality of measurement locations of the first mobile device in the first reference frame based on images of the environment captured by the camera at each of the first plurality of measurement locations.

5. The method according to claim 1, the determining the first relative rotational transformation and the first relative translational transformation further comprising:
   estimating the first relative rotational transformation and the first relative translational transformation by minimizing differences between (i) the first plurality of distance measurements and (ii) corresponding distances calculated based on the estimated first relative rotational transformation, the estimated first relative translational transformation, the first plurality of measurement locations of the first mobile device, and the second plurality of measurement locations of the second mobile device.

6. The method according to claim 3, the generating the three-dimensional map further comprising:
   determining a direction of gravity using an accelerometer of the mobile device; and
   generating the three-dimensional map with a first coordinate axis of the first reference frame aligned with the direction of gravity, the first reference frame having three orthogonal coordinate axes including the first coordinate axis, a second coordinate axis, and a third coordinate axis.

7. The method according to claim 6, the determining the first relative rotational transformation and the first relative translational transformation further comprising:
   determining a value for a first rotational component of the first relative rotational transformation, the first relative rotational transformation being characterized by three orthogonal rotational components including the first rotational component, a second rotational component, and a third rotational component, the first rotational component being a rotation about the first coordinate axis of the first reference frame; and
   setting the second rotational component and the third rotational component of the first relative rotational transformation equal to zero.

8. The method according to claim 6, the determining the first relative rotational transformation and the first relative translational transformation further comprising:

determining a first translational component of the first relative translational transformation such that it is within a predetermined range of values, the predetermined range of values defined between a predetermined minimum value and a predetermined maximum value, the first relative translational transformation being characterized by three orthogonal translational components including the first rotational component, a second translational component, and a third translational component.

9. The method according to claim 6, the determining the values of each of the first plurality of measurement locations of the first mobile device further comprising:
determining an average value of first coordinates of the first plurality of measurement locations of the first mobile device, each measurement location in the first plurality of measurement locations comprising the first coordinate on the first coordinate axis, a second coordinate on the second coordinate axis, and a third coordinate on the third coordinate axis; and
updating the first coordinate of each of the first plurality of measurement locations of the first mobile device by setting the first coordinate equal to the average value.

10. The method according to claim 6, the generating the three-dimensional map further comprising:
initializing first coordinates of the three-dimensional map along the first coordinate axis of the first reference frame at a predetermined height value.

11. The method according to claim 1 further comprising:
measuring a second plurality of distance measurements between the first mobile device and a third mobile device, the second plurality of distance measurements being measured by operating the first wireless transceiver of the first mobile device to exchange messages with a third wireless transceiver of the third mobile device;
receiving, from the third mobile device, a third plurality of measurement locations of the third mobile device, each measurement location in the second plurality of measurement locations being a location of the third mobile device from which a corresponding distance measurement in the second plurality of distance measurements was measured and being in a third reference frame that is different than the first reference frame;
determining a second relative rotational transformation and a second relative translational transformation between the third reference frame and the first reference frame, based on the second plurality of distance measurements and the third plurality of measurement locations of the third mobile device; and
determining a third relative rotational transformation and a third relative translational transformation between the third reference frame and the second reference frame, based on the first relative rotational transformation, the first relative translational transformation, the second relative rotational transformation, and the second relative translational transformation.

12. The method according to claim 1, wherein the first wireless transceiver of the first mobile device is an ultra-wideband transceiver and the second wireless transceiver of the second mobile device is an ultra-wideband transceiver.

13. The method according to claim 1, the receiving the second plurality of measurement locations further comprising:
receiving the second plurality of measurement locations from the second mobile device with a third transceiver of the first mobile device, which is different from the first transceiver of the first mobile device.

14. The method according to claim 13, wherein the third transceiver is a Wi-Fi transceiver.

15. The method according to claim 1, the measuring the first plurality of distance measurements further comprising:
measuring times of flight of messages transmitted between the first mobile device and the second mobile device.

16. The method according to claim 1 further comprising:
receiving, from the second mobile device, at least one of a current location and a current orientation of the second mobile device in the second reference frame; and
determining, with the processor of the first mobile device, at least one of a current location and a current orientation of the second mobile device in the first reference frame, based on the first relative rotational transformation, the first relative translational transformation, and the at least one of the current location and the current orientation of the second mobile device in the second reference frame.

17. The method according to claim 16 further comprising:
displaying, on a display screen of the first mobile device, a graphical user interface having graphical elements that are rendered depending on the at least one of (i) the current location and (ii) the current orientation of the second mobile device in the first reference frame.

18. The method according to claim 17, the displaying further comprising:
capturing, with the camera, a second plurality of images of the environment; and
displaying the graphical user interface having the second plurality of images of the environment displayed in real-time with the graphical elements superimposed on the second plurality of images.

19. The method according to claim 1 further comprising:
receiving, from the second mobile device, object data regarding at least one of (i) a real object and (ii) a virtual object located in the environment, the object data including at least one of a location and an orientation of the at least one of (i) the real object and (ii) the virtual object in the second reference frame; and
determining, with a processor of the first mobile device, at least one of a location and a orientation of the at least one of (i) the real object and (ii) the virtual object in the first reference frame, based on the first relative rotational transformation, the first relative translational transformation, and the at least one of the location and the current orientation of the second mobile device in the second reference frame,
displaying, on a display screen of the first mobile device, a graphical user interface having a graphical depiction of the at least one of (i) the real object and (ii) the virtual object, the graphical depiction being rendered depending on the at least one of the location and the orientation of the at least one of (i) the real object and (ii) the virtual object in the first reference frame.

20. A first mobile device for spatially registering a second mobile device in an environment, the mobile device comprising:
a first wireless transceiver configured to measure distances between the first mobile device and the second mobile device by exchanging messages with a second wireless transceiver of the second mobile device; and a processor operably connected to the first wireless transceiver, the processor being configured to:
- measure, with the first wireless transceiver, a first plurality of distance measurements between a first mobile device and a second mobile device, each distance measurement in the first plurality of distance measurements being measured from a corresponding location of the first mobile device in a first plurality of measurement locations of the first mobile device that are in a first reference frame;
- receive, from the second mobile device, a second plurality of measurement locations of the second mobile device, each measurement location in the second plurality of measurement locations being a location of the second mobile device from which a corresponding distance measurement in the first plurality of distance measurements was measured and being in a second reference frame that is different than the first reference frame; and
- determine a first relative rotational transformation and a first relative translational transformation between the second reference frame and the first reference frame, based on the first plurality of distance measurements, the first plurality of measurement locations of the first mobile device, and the second plurality of measurement locations of the second mobile device.

\* \* \* \* \*